(12) United States Patent
Zielke et al.

(10) Patent No.: US 9,043,096 B2
(45) Date of Patent: May 26, 2015

(54) COMBINE BIN LEVEL MONITORING SYSTEM

(75) Inventors: Roger R. Zielke, Huxley, IA (US); John F. Howard, Ames, IA (US)

(73) Assignee: AG LEADER TECHNOLOGY, Ames, IA (US)

( * ) Notice: Subject to any disclaimer, the term of this patent is extended or adjusted under 35 U.S.C. 154(b) by 357 days.

(21) Appl. No.: 13/412,000

(22) Filed: Mar. 5, 2012

(65) Prior Publication Data

US 2012/0253611 A1    Oct. 4, 2012

Related U.S. Application Data

(60) Provisional application No. 61/470,258, filed on Mar. 31, 2011.

(51) Int. Cl.
*A01D 41/127* (2006.01)
(52) U.S. Cl.
CPC .......... *A01D 41/1275* (2013.01); *A01D 41/127* (2013.01)
(58) Field of Classification Search
CPC .......... A01D 41/127–41/1273; A01D 41/1275
USPC ............................................. 701/50; 702/129
See application file for complete search history.

(56) References Cited

U.S. PATENT DOCUMENTS

| | | | |
|---|---|---|---|
| 5,750,877 A * | 5/1998 | Behnke et al. .................. 73/1.33 |
| 5,863,247 A * | 1/1999 | Behnke et al. ..................... 460/6 |
| 5,890,961 A * | 4/1999 | Behnke et al. ..................... 460/6 |
| 6,584,424 B2 * | 6/2003 | Hardt ............................ 702/129 |
| 7,073,314 B2 | 7/2006 | Beck et al. |
| 7,877,181 B2 * | 1/2011 | Chervenka et al. ............. 701/50 |
| 8,032,255 B2 * | 10/2011 | Phelan et al. .................. 700/281 |
| 2002/0133309 A1 | 9/2002 | Hardt |
| 2005/0003875 A1 | 1/2005 | Beck et al. |
| 2005/0137002 A1 * | 6/2005 | Murray et al. ..................... 460/1 |
| 2009/0325658 A1 | 12/2009 | Phelan et al. |
| 2012/0200697 A1 * | 8/2012 | Wuestefeld et al. .......... 348/137 |
| 2012/0253760 A1 * | 10/2012 | Zielke ............................... 703/2 |

FOREIGN PATENT DOCUMENTS

EP    2250871 A1 * 11/2010 ........... A01D 41/127

OTHER PUBLICATIONS

International Search Report, mailed Jun. 6, 2012, Applicant: Ag Leader Technology, Application No. PCT/US2012/27697 filed Mar. 5, 2012 (10 pages).

* cited by examiner

*Primary Examiner* — John Q Nguyen
*Assistant Examiner* — Michael Whalen
(74) *Attorney, Agent, or Firm* — McKee, Voorhees & Sease, P.L.C.

(57) ABSTRACT

A combine bin level monitor may include a yield monitor to determine how much grain has been added to the combine tank, a container weighing system (e.g. scales on a grain cart) that measures the amount of grain unloaded from the combine tank and wirelessly transfers the amount to the combine bin level monitoring system. The system further includes a software routine in the combine bin level monitoring system that calculates and displays the bin level by adding grain accumulated by the yield monitor and subtracting grain accumulated by the container weighing system from the last known amount of grain in the combine tank. The accumulated grain is the amount accumulated since the last time the amount of grain in the combine tank was known.

13 Claims, 4 Drawing Sheets

COMBINE BIN LEVEL MONITORING SYSTEM

CROSS-REFERENCE TO RELATED APPLICATIONS

This application claims priority under 35 U.S.C. §119 to provisional application Ser. No. 61/470,258 filed Mar. 31, 2011, herein incorporated by reference in its entirety.

FIELD OF THE INVENTION

The present invention relates to combines. More particularly, but not exclusively, the present invention relates to monitoring combine bin level on a combine.

BACKGROUND OF THE INVENTION

Many large farming operations use grain carts and harvest fields in 'lands.' The combine operator strikes through the field in certain spots so they can harvest with their unloading auger always on the harvested side of the field and harvesting in a counter-clock-wise motion. This allows the grain cart to stay close to the combine allowing for more efficient harvesting. FIG. 1 illustrates a combine and grain cart in a field. Note that that the grain cart is positioned to the side of the combine in a portion of the field which has already been harvested. FIG. 2 shows a combine operator starting a new land. Notice the un-harvested crop on both sides of the machine. Combine operators prefer to strike through a field with an empty grain tank, to ensure they can make it the whole length of the field before the tank is full. If an operator strikes through with too much grain in the tank, it may become full before they reach the end of the field and the combine may become stuck with a full tank and nowhere to go. The operator then has several choices which may include: 1) continue harvesting until the combine has reached the end of the field and grain spilling over the top of the grain tank; 2) back the combine up until it reaches an area where it can unload the grain tank; or 3) stop and create an area where the grain cart can come to catch the combine's grain. All three options presented above are time consuming or wasteful.

Various attempts have been made at estimating how much is in the tank by the combine operator looking into the grain tank. Operators can look through a window from inside the cab or stop the combine, get out of the cab and climb on top of the combine tank. Shortcomings of this practice are that it is difficult to estimate quantity of grain accurately and stopping the combine decreases harvest efficiency.

Bin level sensors have been used to trigger an alarm when the combine tank gets full. Sometimes two bin level sensors are used, one to indicate almost full and another for completely full. This works well for preventing the tank from overflowing, but it does not afford all the benefits of a real time bin level tracking system.

Another approach is to use a yield monitor to measure grain added to the combine tank. The yield monitor does not account for grain unloaded from the tank. The operator can re-zero the combine tank level each time the combine tank is completely emptied, but the operator has to estimate grain unloaded during a partial unload event.

One such example is AGCO's grain tank level feature which is used with an AGCO Fieldstar II monitor and AGCO yield sensors. Their feature counts bushels added to combine tank based on data received from the mass flow sensor. The bushel counter is manually reset every time the grain tank is unloaded and does not provide a way to know what may be left in the tank during a partial unloading.

U.S. Pat. No. 8,032,255 to Phelan et al. discloses a bin monitoring system. Phelan et al. teaches using a mass flow sensor to measure how much grain enters the combine tank. Monitoring the revolutions of the unloading auger is taught as a means to measure how much grain has been unloaded from the tank. A bin level sensor is taught as a means to determine a known amount of grain in the tank for calibration purposes. A monitoring system uses the combination of these three elements to calculate and display a live reading of the amount of grain in the combine tank. Phelan et al. teaches using the bin level sensor to reset the bin level to a known amount.

Yet, despite various attempts at knowing the amount of grain in a tank or bin of a combine, problems remain.

SUMMARY

Therefore, it is a primary object, feature, or advantage of the present invention to improve over the state of the art.

It is a further object, feature, or advantage of the present invention to provide a method and system for a combine bin level monitoring that is convenient to use and aids in a combine operator's ability to manage the harvest process in an effective and efficient manner.

Another object, feature, or advantage of the present invention is to provide for calibrating the unloading auger flow rate for moisture.

Yet another object, feature, or advantage of the present invention is to use unique unloading auger calibrations for various ranges of combine bin levels.

According to one aspect of the present invention, a combine bin level monitor system is provided. The combine bin level monitor system includes a yield monitor to determine how much grain has been added to the combine tank, a container weighing system (e.g. scales on a grain cart) that measures the amount of grain unloaded from the combine tank and wirelessly transfers the amount to the combine bin level monitoring system. The system further includes a software routine in the combine bin level monitoring system that calculates and displays the bin level by adding grain accumulated by the yield monitor and subtracting grain accumulated by the container weighing system from the last known amount of grain in the combine tank. The accumulated grain from the yield monitor and container weighing system is the amount accumulated since the last time the amount of grain in the combine tank was known.

According to another aspect of the present invention, a combine bin level monitor system may include a yield monitor configured to determine a first amount of grain, wherein the first amount of grain is grain added to a combine tank during a crop harvesting event and a container weighing system configured to measure a second amount of grain, wherein the second amount of grain is grain unloaded from the combine tank during a combine tank unloading event. The container weighing system may include at least one sensor and a wireless transmitter operatively connected to the at least one sensor to wirelessly transfer data indicative of the second amount of grain. The combine bin level monitor system may further include an intelligent control operatively connected to a wireless receiver in operative communication with the wireless transmitter and the intelligent control operatively connected to the yield monitor and wherein the intelligent control is configured to update a bin level by adding the first amount and subtracting the second amount.

According to another aspect of the present invention, a combine bin level monitor system may include a yield monitor to determine how much grain has been added to the combine tank from a crop harvesting event, a moisture sensor to measure moisture of grain in the combine tank, and a bin level sensor to determine when the combine tank is empty. The system may further include an intelligent control operatively connected to the yield monitor, the moisture sensor, and the bin level sensor and configured to determine an amount of grain unloaded from the combine tank by using a known amount of grain dispensed from a combine unloading auger to calibrate grain flow rate of the unloading auger and to calibrate unloading auger grain flow rate for moisture. The intelligent control is further configured to calculate a bin level by adding grain accumulated by the yield monitor from a crop harvesting event and subtracting grain removed from the combine tank by the combine unloading auger and wherein the intelligent control is further configured to automatically reset the bin level to zero when one or more bin level sensors sense that the combine tank is empty.

According to another aspect of the present invention, a combine bin level monitor system is provided. The system includes a yield monitor to determine how much grain has been added to the combine tank, a means to measure moisture of grain in combine tank, a bin level sensor as a means to determine when combine tank is empty, and a system to determine amount of grain unloaded from the combine tank which uses a known amount of grain dispensed from combine unloading auger as a means to calibrate grain flow rate of unloading auger. The system also has a means to calibrate unloading auger grain flow rate for moisture. The system may also include a software routine in the combine bin level monitoring system that calculates and displays the bin level by adding grain accumulated by the yield monitor and subtracting grain accumulated by the unloading auger from the last known amount of grain in the combine tank. The accumulated grain is the amount accumulated since the last time the amount of grain in the combine tank was known. The system may also include a software routine that automatically resets bin level to zero when empty bin level sensor signals tank is empty.

The system may also include one or more of a means to calibrate unloading auger grain flow rate for test weight, a means to calibrate unloading auger grain flow rate for incline angle of unloading auger, a means to determine the amount of grain the unloading auger has removed from the grain tank by directly or indirectly counting revolutions or monitoring rpms of the auger, a means to determine the amount of grain the unloading auger has removed from the grain tank by timing how long the auger has removed grain from the combine tank, and a means to determine, use and store a unique unloading auger grain flow rate calibration for ranges of different amounts of grain in tank.

An indirect means of counting revolutions or monitoring rpm's of the unloading auger is defined as counting revolutions or monitoring rpm's of a rotating device on the combine whose rate of rotation is directly proportional to the rate of rotation of the unloading auger.

The amount of grain unloaded from the combine may be determined by an external weighing system. The system may also include a means to exclude grain left in unloading auger after an unloading event, from being added to the combine's live bin level in the next unloading event. The system may determine amount of grain left in unloading auger by timing how long the unloading auger remains on after the empty bin level sensor indicates the combine tank is empty. The system may determine the amount of grain left in unloading auger by counting revolutions or monitoring rpm of unloading auger after the empty bin level sensor indicates the combine tank is empty. The system may also determine the amount of grain left in the unloading auger by using the combination of an empty bin level sensor and a sensor mounted on the output of the unloading auger that signals when grain is dispensing or not dispensing from unloading auger.

According to another aspect of the present invention, a method of monitoring combine bin level is provided. The method may include determining a first amount of grain using a yield monitor wherein the first amount of grain is grain added to a combine tank during a crop harvesting event. The method may further include determining a second amount of grain from a container weighing system wherein the second amount of grain is grain unloaded from the combine tank during a combine tank unloading event. The method may further include updating a bin level for the combine tank using an intelligent control by adding the first amount of grain and subtracting the second amount of grain. The method may further include displaying on a display an indicia of the bin level as well as wirelessly transmitting the second amount of grain from the container weighting system to a wireless receiver electrically connected to the intelligent control. The method may further include adjusting the bin level by subtracting from the bin level an amount of grain removed from the combine tank but not dispensed into a container associated with the container weighing system.

DETAILED DESCRIPTION

Knowing the amount of grain in the combine tank, hereby referred to as "bin level," in real time is useful for a number of reasons. For example, knowing the amount of grain in the combine tank assists in determining which combine the grain cart should unload first when there are multiple combines harvesting in the same field. The grain cart operator may also factor in how much room is left in the grain cart when deciding which combine to unload. In addition, if the amount of grain in a container, such as a grain cart or truck, is known, the combine operator can determine if the container will hold all the grain in the combine tank. If it cannot, the combine operator may choose to unload into another container that has enough room to hold all the grain in the combine tank. This reduces the time it takes to empty the combine tank, because the combine does not have to move to a second container during the course of unloading.

Knowing the amount of grain in the combine tank also allows for a real time calculation of how much additional grain can be added before the tank overflows. This is useful for a number of purposes. For example, this information may be used to determine if there is enough room in the combine tank to cut through a new land. This information may also be used so that harvest passes are performed in the most efficient order. For example, odd shaped or terraced fields have areas with different pass lengths. If the tank is near full and the grain cart is delayed, the operator may choose to harvest time consuming shorter passes. If the combine tank is near empty, the operator may harvest longer passes that maximize harvested grain while waiting for the grain cart.

In addition, this information may be used to summon a grain cart to unload the combine while the combine continues to harvest. Harvest efficiency is increased because the combine is not stopped by a full tank. This is especially useful when multiple combines are harvesting the same field.

This information may also be used to predict how many passes the combine can complete before the combine tank overflows. The amount of grain in a predicted pass is assumed to equal the amount of grain in a selected harvested pass, such as the last pass harvested. Pass prediction helps the grain cart know where and when it needs to be to unload the combine tank, particularly in cases where multiple passes are required to fill the combine tank and/or multiple combines are harvesting same field. This can minimize the field area the grain cart drives over which reduces soil compaction. Thus, it should be understood that knowing the amount of grain in a combine tank is advantageous in that it can be used to improve the efficiency of harvesting operations so as to save time, reduce fuel expenses, avoid undue soil compaction, or otherwise improve efficiency or provide an advantage.

Figure 1:
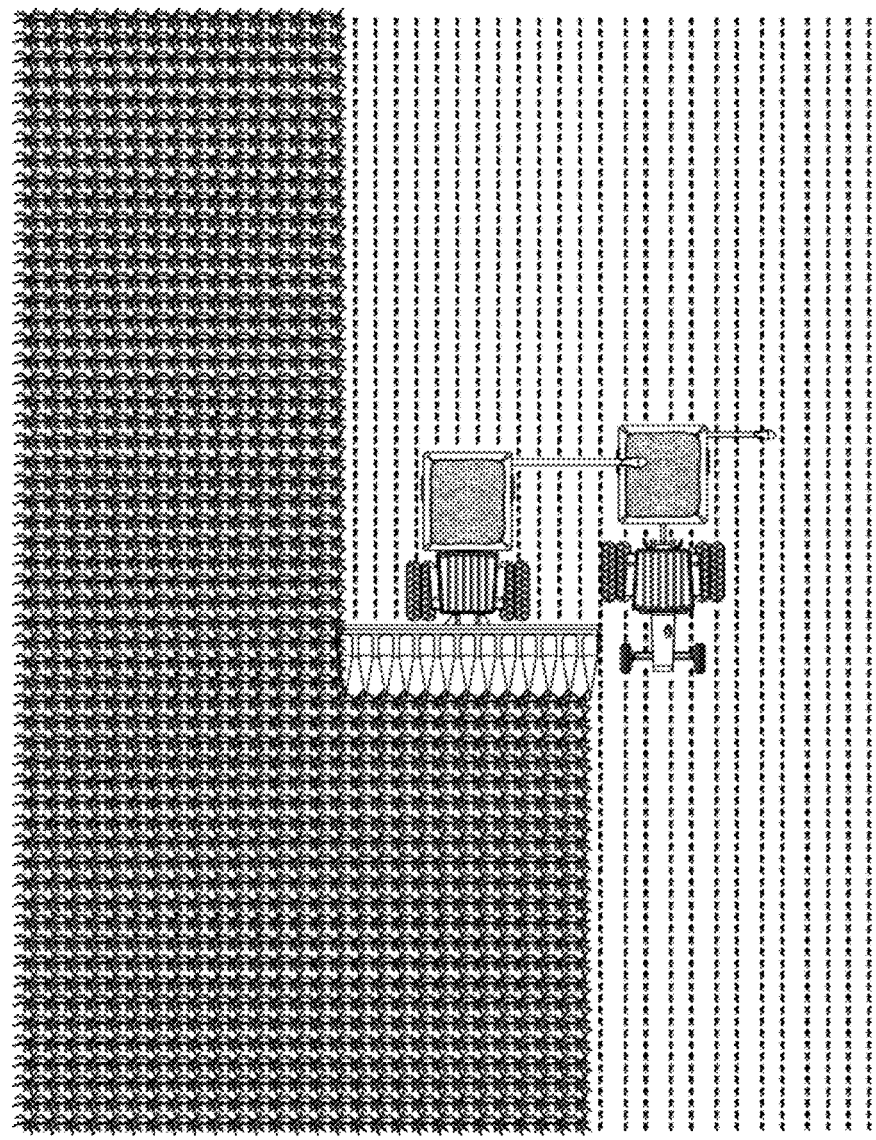
FIG. 1 is a pictorial representation illustrating a combine and grain cart in a field. Note that that the grain cart is positioned to the side of the combine in a portion of the filed which has already been harvested.
Figure 2:
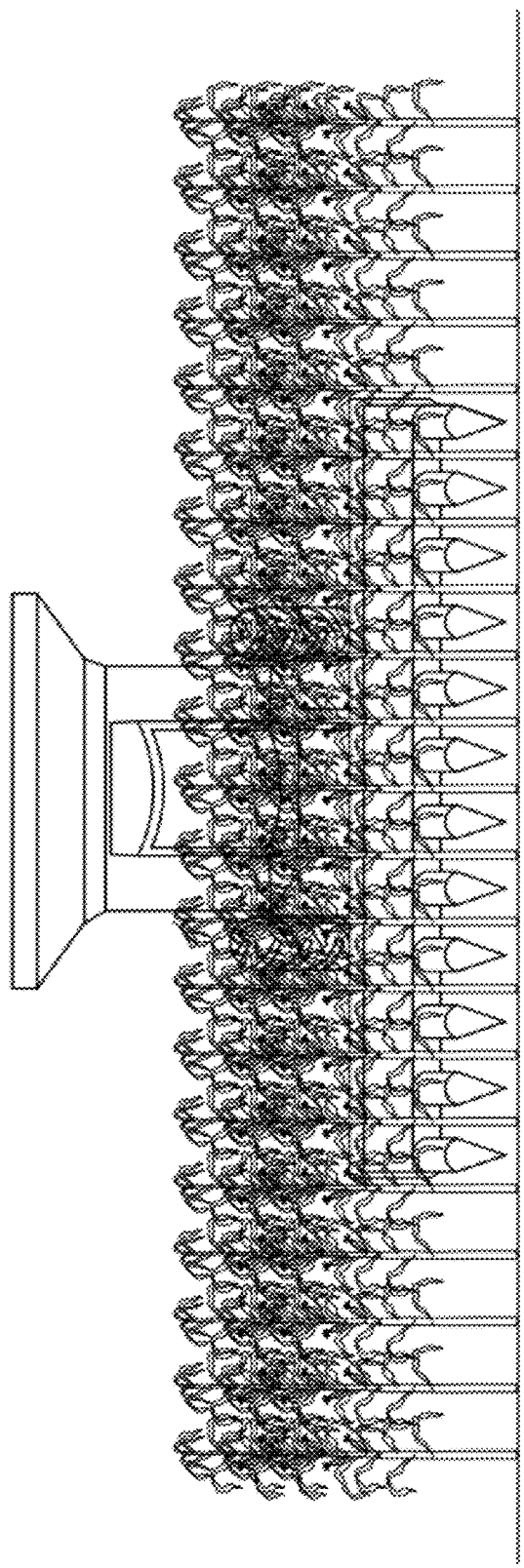
FIG. 2 is a pictorial representation of a combine cutting a new land.
Figure 3:
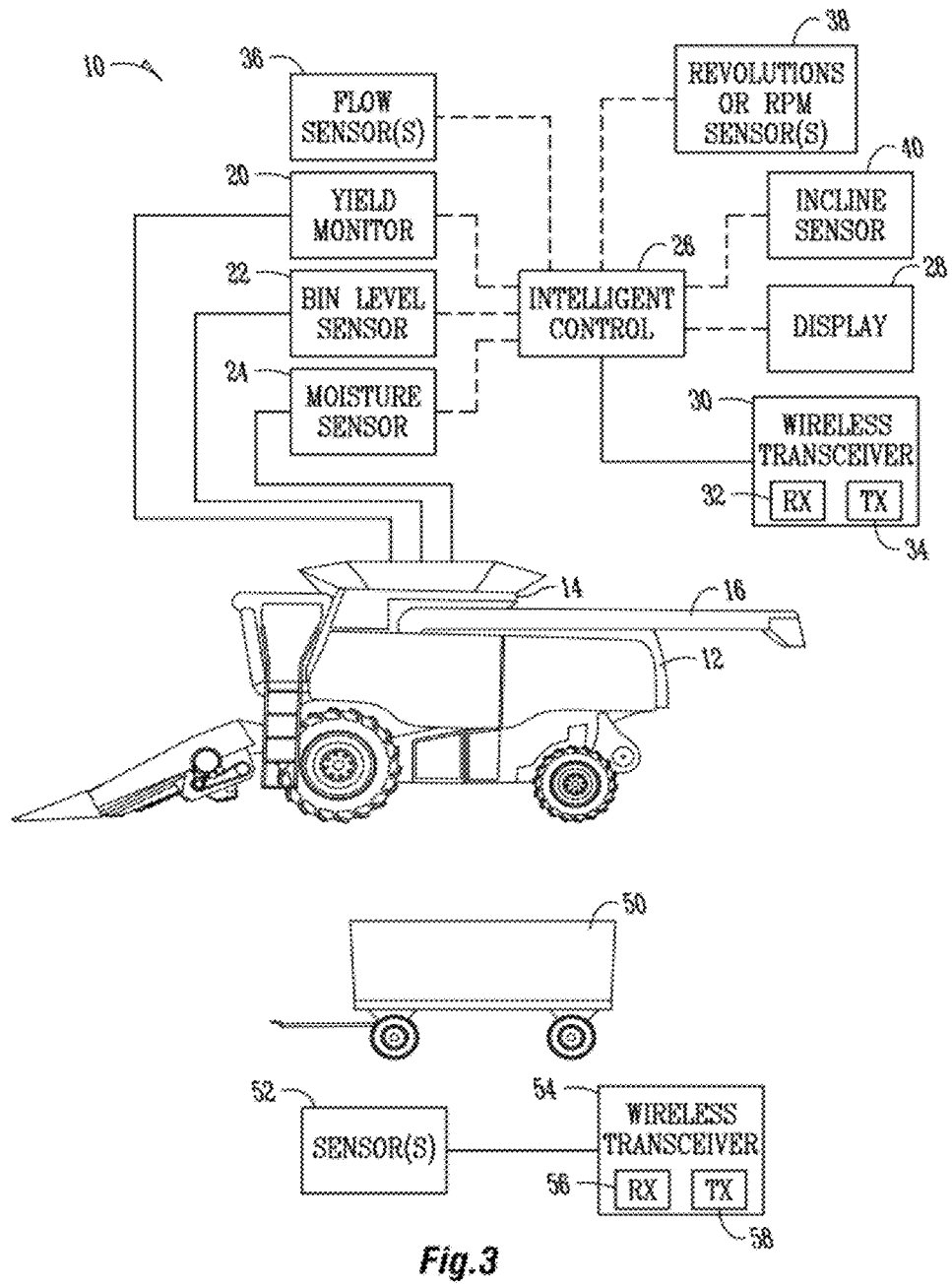
FIG. 3 is a pictorial representation of one example of a system which can provide for monitoring and display of grain level within a grain tank or grain bin of a combine.

FIG. 3 is a pictorial representation of one example of a system which provides for monitoring and displaying grain level within a grain tank or grain bin of a combine. In FIG. 3, a system 10 is provided. As shown, the system 10 includes a combine 12 having a grain bin (sometimes known as a grain tank) 14 to hold grain after it is harvested. Grain within the grain bin 14 may be offloaded through an auger 16.

Also shown in FIG. 3 is a yield monitor 20, a bin level sensor 22, a moisture sensor 24, an intelligent control 26, a display 28, and a wireless transceiver 30 with a receiver 32 and a transmitter 34. The yield monitor 20 may be of the conventional type and configured to determine yield. The intelligent control 26 may include a computer, a processor, a microcontroller, or other type of circuitry. The wireless transceiver 30 may be of any number of types.

A grain cart 50 is also shown. Grain from the bin 14 of the combine 12 may be off-loaded through the auger 16 into the grain cart 50. Sensors 52 may be used to weigh the grain in the grain cart 50. The sensors 52 may be of any number of types suitable for measurement of weight such as, but not limited to, strain gage sensors. The change in the weight of the grain in the grain cart 50 may be used in determining the amount of grain emptied from the bin 14. A wireless transceiver 54 (which may include a receiver 56 and a transmitter 58) may be used to convey the weight information to the wireless transceiver 30 associated with the combine 12. Note that the wireless transceiver 54 need only be used to communicate the weight information and not for other purposes such as calibration or otherwise.

Various other types of sensors may be connected to the intelligent control 26. One use of such sensors is to provide information for the intelligent control 26 to use to compensate for grain in the unloading auger 16. It is to be appreciated that there may be grain in the unloading auger 16 when a grain tank 14 is being emptied. Thus, in an unloading operation into the grain cart 50, the contents of the grain tank 14 as well as the initial contents of the unloading auger 16 may be added to the grain cart 50. The contents of the unloading auger 16 may be compensated for in various ways. For example one or more flow sensors 36 may be operatively connected to the intelligent control 26. One or more flows sensor may be used to monitor flow of grain into and/or out of the unloading auger 16. Alternatively, one or more sensors 38 may be used to directly or indirectly monitor the number of rotations of the unloading auger 16 or the rate of rotations such as revolutions per minute (rpm) of the unloading auger 16. In addition an incline sensor 40 may be used to sense an incline angle of the unloading auger 16. It is contemplated that different incline angles will result in different grain flow rates. It is further contemplated that the length of use of the unloading auger 16 may be timed. Measuring or calculating grain flow rate assists the intelligent control 26 to compensate for grain within the unloading auger.

Figure 4:
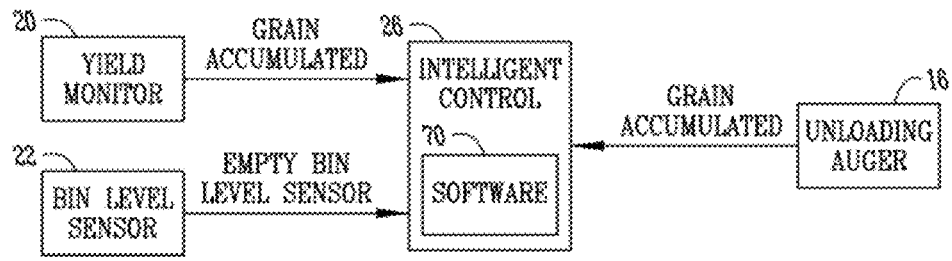
FIG. 4 is a block diagram illustrating a monitoring system for determining the grain level within a grain tank or grain bin of a combine.

FIG. 4 is a block diagram illustrating a monitoring system for determining the grain level within a grain tank or grain bin of a combine. In the monitoring system, an intelligent control 26 may be programmed with software instructions 70 which are stored on a machine readable storage medium. The intelligent control 26 may receive information from a yield monitor 20 which may include an amount of grain accumulated. The intelligent control 26 may receive information from a bin level sensor 22 which may include information such as a signal that the bin is empty, or a signal otherwise indicative of the level of grain in the bin. The intelligent control 26 may also receive information from an unloading auger 16 which is indicative of how much grain has been unloaded from the bin of a combine.

Figure 5:
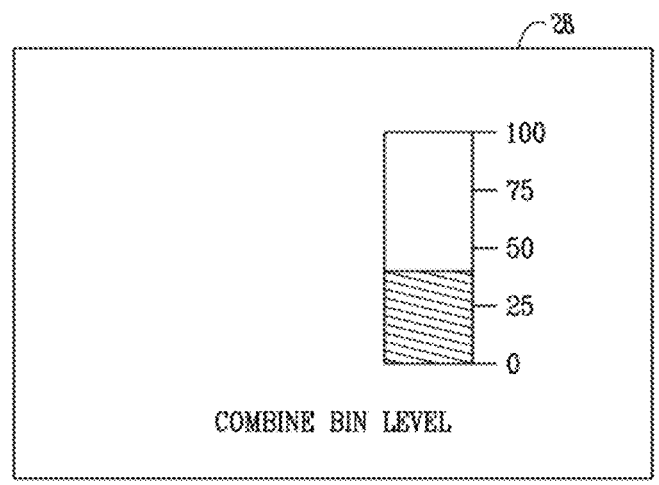
FIG. 5 is a pictorial representation of one embodiment of a screen display for visually representing the grain level within a grain bin of a combine.

FIG. 5 is a pictorial representation of one embodiment of a screen display viewable on a display 28 for visually representing the grain level within a grain bin of a combine. The present invention contemplates that such information may be conveyed in numerous ways textually, graphically, or otherwise.

Although the present invention has been described with respect to specific embodiments, it is to be understood that the present invention contemplates numerous options, variations, and alternatives. The present invention is not to be limited to the specific embodiments described herein.

What is claimed is:
1. A combine bin level. monitor system comprising:
a yield monitor configured to determine an amount of grain added to a combine tank during a crop harvesting event;
a container weighing system configured to measure an actual amount of grain unloaded from the combine tank into a container associated with the container weighing system during a combine tank unloading event and wherein the container weighing system comprises at least one sensor and a wireless transmitter operatively connected to the at least one sensor to wirelessly transfer data indicative of the actual amount of grain unloaded from the combine tank into the container associated with the container weighting system during the combine tank unloading event;
an intelligent control operatively connected to a wireless receiver in operative communication with the wireless transmitter and the intelligent control operatively connected to the yield monitor and wherein the intelligent control is configured to receive through the wireless receiver the actual amount of grain unloaded from the combine tank into the container associated with the container weighing system during the combine tank unloading event and update a bin level by adding the amount of grain added to the combine tank during the crop harvesting event and subtracting the actual amount of grain unloaded from the combine tank into the container asso- ciated with the container weighing system during the combine tank unloading event; and wherein the intelligent control is further configured to compensate for grain in an unloading auger by using an unloading auger grain flow rate calibration specific to a range of amount of grain in the tank.

2. The combine bin level monitor system of claim 1 further comprising a display operatively connected to the intelligent control for displaying an indicator of the live bin level.

3. The combine bin level monitor system of claim 1 further comprising a moisture sensor operatively connected to the intelligent control.

4. The combine bin level monitor system of claim 1 further comprising a bin level sensor operatively connected to the intelligent control.

5. The combine bin level monitor system of claim 1 further comprising wherein the intelligent control is configured to use a known amount of grain dispensed from a combine unloading auger to calibrate grain flow rate of the unloading auger and to calibrate unloading auger grain flow rate for moisture.

6. The combine bin level monitor system of claim 1 further comprising a wireless transmitter operatively connected to the intelligent control for sending the bin level.

7. The combine bin level monitor system of claim 1 wherein the intelligent control is further configured to compensate for grain in an unloading auger.

8. A combine bin level monitor system comprising:
    a yield monitor to determine how much grain has been added to the combine tank from a crop harvesting event;
    a moisture sensor to measure moisture of grain in the combine tank;
    a bin level sensor to determine when the combine tank is empty;
    an intelligent control operatively connected to the yield monitor, the moisture sensor, and the bin level sensor and configured to determine an amount of grain unloaded from the combine tank by using a known amount of grain dispensed from a combine unloading auger to calibrate grain flow rate of the unloading auger and to calibrate unloading auger grain flow rate for moisture;
    wherein the intelligent control is further configured to calculate a bin level by adding grain accumulated by the yield monitor from a crop harvesting event and subtracting grain removed from the combine tank by the combine unloading auger;
    wherein the intelligent control is further configured to automatically reset the bin level to zero when one or more bin level sensors sense that the combine tank is empty;
    wherein the intelligent control is further configured to compensate for grain in an unloading auger; and
    wherein the intelligent control compensates for grain in the unloading auger by using an unloading auger grain flow rate calibration specific to a range of amount of grain in the tank.

9. The combine bin level monitor system of claim 8 wherein the unloading auger grain flow rate changes based on the amount of grain in the tank.

10. A method of monitoring combine bin level, the method comprising:
    determining a first amount of grain using a yield monitor wherein the first amount of grain is grain added to a combine tank of a combine during a crop harvesting event;
    determining a second amount of grain from a container weighing system wherein the second amount of grain is an actual amount of grain unloaded from the combine tank into a container associated with the container weighing system during a combine tank unloading event;
    updating a bin level for the combine tank using an intelligent control by adding the first amount of grain and subtracting the second amount of grain and compensating for grain in an unloading auger of the combine by using an unloading auger grain flow rate calibration specific to a range of amount of grain in the tank; and
    displaying on a display an indicia of the bin level.

11. The method of claim 10 further comprising wireless transmitting the second amount of grain from the container weighing system to a wireless receiver electrically connected to the intelligent control.

12. The method of claim 10 further comprising wirelessly communicating the bin level to an external system.

13. The method of claim 12 wherein the external system is associated with a grain container not on a combine.

* * * * *